United States Patent
Lovelady

[11] 3,931,016
[45] Jan. 6, 1976

[54] SELF-CLEANING FLUID FILTER

[76] Inventor: Grady R. Lovelady, 1624 San Altos Place, Lemon Grove, Calif. 92045

[22] Filed: Feb. 20, 1975

[21] Appl. No.: 551,258

[52] U.S. Cl. .................. 210/297; 55/400; 55/406; 210/416; 210/456
[51] Int. Cl.² ........................................ B01D 23/24
[58] Field of Search ........... 210/106, 107, 297, 311, 210/416, 456; 55/400, 403, 406

[56] References Cited
UNITED STATES PATENTS

| | | | |
|---|---|---|---|
| 1,694,666 | 12/1928 | Pease | 55/403 |
| 2,213,881 | 9/1940 | Lauer | 55/403 X |
| 2,823,656 | 2/1958 | Dolza | 55/400 X |
| 2,994,407 | 8/1961 | Diepenbroek | 55/400 X |
| 3,865,022 | 2/1975 | Ahlrich | 55/406 |

Primary Examiner—Theodore A. Granger
Attorney, Agent, or Firm—Richard K. Macneill

[57] ABSTRACT

A self-cleaning fluid filter for filtering fluid entering an inlet of a pump, such as an air pump, in which a fluid filter is wrapped around a filter spool forming a filter drum and the drum coupled to the shaft of the pump motor for rotation thereof. The fluid entering the rotating filter will then be filtered of its impurities which, due to centrifugal force, will be dispersed outwardly from the filter drum to drop into a residue container. A deflector plate is disposed in proximity to the inlet for deflecting heavy particles to the residue container.

4 Claims, 2 Drawing Figures

SELF-CLEANING FLUID FILTER

BRIEF DESCRIPTION OF THE INVENTION

The present invention relates to a self-cleaning fluid filter and more particularly to a self-cleaning fluid filter which is rotatably attached to a pump motor.

According to the invention, a self-cleaning fluid filter is wrapped around a filter spool which comprises a filter drum. The filter can be either an air filter or a water filter, etc. The drum is then attached to the drive shaft of a pump motor. As the motor rotates the pump pulls the fluid through the fluid filter, i.e., the wall of the drum leaving the residue on the outside of the filter which due to centrifugal force caused by rotation of the filter will be dispersed and collected in a suitable container. A deflector plate is disposed in proximity to the inlet for deflecting heavy particles to the container. An annular plate surrounds the top portion of the filter drum in immediate proximity but spaced from the top of the container. This forms an air seal between the drum and the container since the high pressure area will be the exhaust side of the container, bleeding a small amount of filtered air back into the container and allowing only filtered air to be exhausted therefrom. An adjustable damper is provided for optimizing the air seal.

An object of the present invention is the provision of a self-cleaning fluid filter.

Another object of the invention is the provision of a self-cleaning fluid filter which rotates causing filtered particles to disperse.

A further object of the invention is the provision of a self-cleaning fluid filter which is inexpensive to manufacture and install and extremely convenient in use.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein:

FIG. 1 is a perspective view, partially sectioned, of the preferred embodiment of the invention; and FIG. 2 is a side elevational view sectioned along the exhaust line of FIG. 1 and through the center of the pump of FIG. 1.

DETAILED DESCRIPTION OF THE DRAWING

Figure 1:
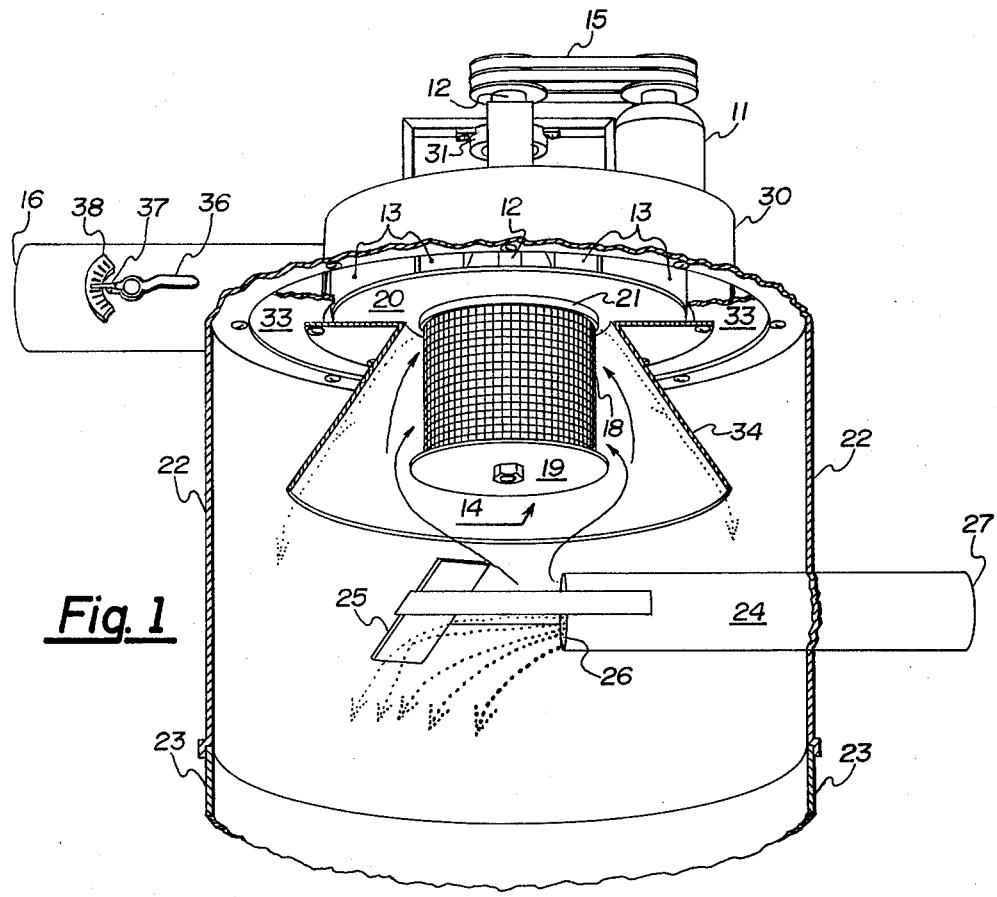

Referring to FIG. 1, a motor 11 is coupled through belt 15 to drive shaft 12, pump 13 and filter drum 14. Pump 13 has exhaust outlet 16. Filter drum 14 has a filter mesh 18 coupled to end plate 19 and intake spider fitting 21 coupled to an opening (not shown) in plate 20 which is fixedly attached to the bottom of the impeller blades of pump 13. Duct 24 is coupled through the wall of housing 22 and has an exhaust outlet 26 and an inlet 27. Deflection plate 25 is coupled by brackets to duct 22. Housing 22 is clamped to container 23. Impeller pump 13 is rotatably disposed within housing 15.

Figure 2:
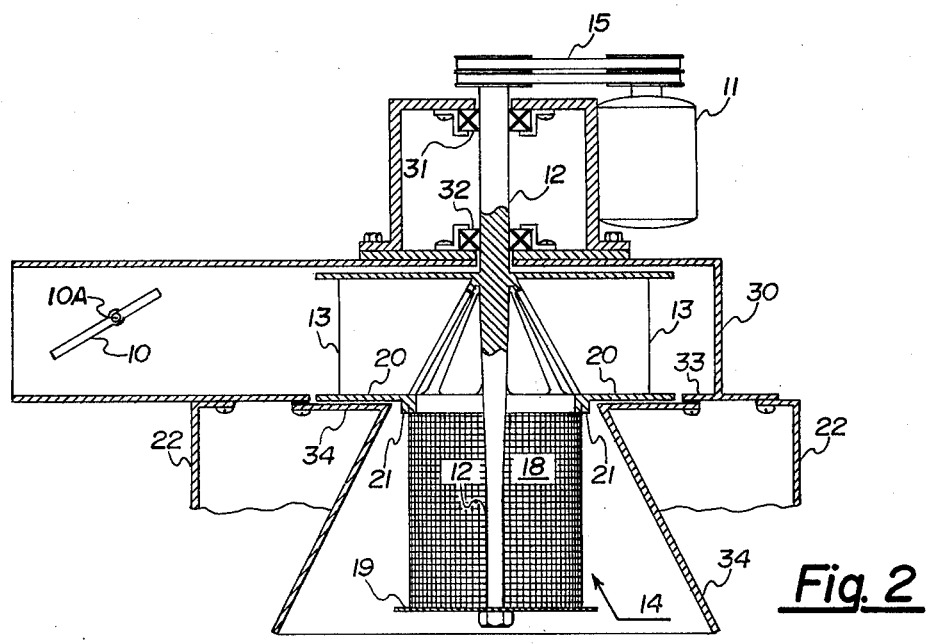

Referring to FIG. 2, motor 11 is shown coupled to shaft 12 via V-belts 15. Shaft 12 is carried by bearings 31 and 32 and terminates at end plate 19 of filter assembly 14. Intake fitting 21 of filter assembly 14 is coupled to bottom plate 20 which is fixedly attached to impeller blades 13. Annular mounting plate 33 is bolted to conical guide 34, housing 22 and pump duct 36. Damper 10 is shown in an intermediate position on its axis 10A. The dotted lines extending from axis illustrate the extreme open and closed position of damper 10. Damper 10 is controlled by handle 36 (FIG. 1), which has an extension 37 riding in detent bar 38 for incremental adjustment thereof.

OPERATION

Referring back to FIGS. 1 and 2, it can be seen that when pump motor 11 is energized, pump 13 pulls air from inlet 27 of duct 24 through duct 24 to outlet 26 within housing 22. The heavier particles will strike deflector plate 25 and fall into container 23. The particles that do not settle into container 23 will attempt to ride through mesh 18 of filter assembly 14 along with the air being pulled by pump 13. These particles will be thrown off the surface of mesh 18 toward the inside wall of housing 22 which will then drop into container 23. The fluid passing through filter 18 into pump 13 will be exhausted through exhaust 16 after passing over damper 10. With the adjustment of damper 10 as by handle 36, a slight pressure area will be formed outside impeller blades 13 which will bleed back through the gap between plate 20 and conical guide 34, insuring that no unfiltered air will pass upward through the said gap. This pressure is adjusted through damper 10 and is optimized when there is very little bleed-back of fluid.

It should be understood, of course, that the foregoing disclosure relates to only a preferred embodiment of the invention, and that it is intended to cover all changes and modifications of the example of the invention herein chosen, for the pruposes of the disclosure, which do not constitute departures from the spirit and scope of the invention.

THE INVENTION CLAIMED IS:

1. A self-cleaning fluid filter comprising:
   a housing, said housing having an intake opening in one side thereof, and a centrally located exhaust opening in a top portion thereof;
   a pump disposed immediately above said exhaust opening, said pump having a plurality of blades;
   a pump duct surrounding said pump and having an exhaust opening;
   an annular plate fixedly attached to the bottom edges of the blades of said pump;
   a cylindrical filter drum attached to said annular plate at a top portion thereof and extending downwardly into said housing through said centrally located exhaust opening, said annular plate and said cylindrical filter drum being disposed in close proximity to said exhaust opening with said annular plate overlapping said exhaust opening; and
   a deflection plate disposed in proximity to said inlet in the direction of flow from said inlet and angled for deflecting particles away from said cylindrical drum.

2. The self-cleaning fluid filter of claim 1 and further including:
   a conical guide extending downwardly from said exhaust opening in said housing converging towards said exhaust opening.

3. The self-cleaning fluid filter of claim 1 and further including:
   an adjustable damper disposed in said pump duct.

4. The self-cleaning fluid filter of claim 1 wherein:
   said inlet and said deflection plate are disposed directly beneath said filter drum.

* * * * *